United States Patent
Gao et al.

(10) Patent No.: US 11,438,870 B2
(45) Date of Patent: Sep. 6, 2022

(54) PAGING MESSAGE TRANSMISSION METHOD AND APPARATUS

(71) Applicant: Huawei Technologies Co., Ltd., Shenzhen (CN)

(72) Inventors: Kuandong Gao, Chengdu (CN); Huang Huang, Chengdu (CN); Hua Shao, Shenzhen (CN); Mao Yan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/094,358

(22) Filed: Nov. 10, 2020

(65) Prior Publication Data

US 2021/0058895 A1 Feb. 25, 2021

Related U.S. Application Data

(63) Continuation of application No. PCT/CN2019/086109, filed on May 9, 2019.

(30) Foreign Application Priority Data

May 11, 2018 (CN) .......................... 201810449591.9

(51) Int. Cl.
*H04W 68/02* (2009.01)
*H04W 68/00* (2009.01)
(Continued)

(52) U.S. Cl.
CPC ..... *H04W 68/005* (2013.01); *H04W 52/0229* (2013.01); *H04W 72/1289* (2013.01)

(58) Field of Classification Search
CPC ... H04W 68/00; H04W 68/02; H04W 68/005; H04W 52/02; H04W 52/0209;
(Continued)

(56) References Cited

U.S. PATENT DOCUMENTS

| 2011/0086608 A1* | 4/2011 | Yamagishi | ............ | H04W 48/12 |
| | | | | 455/404.1 |
| 2011/0090828 A1* | 4/2011 | Zhu | ....................... | H04W 76/40 |
| | | | | 370/310 |

(Continued)

FOREIGN PATENT DOCUMENTS

| CN | 101651850 A | 2/2010 |
| CN | 105992342 A | 10/2016 |

(Continued)

OTHER PUBLICATIONS

Gao (WO/2019/192218) (Year: 2019).*

(Continued)

*Primary Examiner* — Siu M Lee
(74) *Attorney, Agent, or Firm* — Slater Matsil, LLP

(57) ABSTRACT

This application provides a paging message transmission method and apparatus, where the method includes: receiving, by a terminal device, a physical downlink control channel (PDCCH) from a network device, where one or more types of first indication information, second indication information, a short message, and scheduling information of a paging message are carried on the PDCCH, the first indication information is used to indicate that the PDCCH carries the short message and/or the scheduling information, and the second indication information is used to indicate whether the scheduling information of the paging message is valid and/or whether the terminal device needs to receive a physical downlink shared channel (PDSCH); and obtaining, by the terminal device based on the PDCCH, one or more types of the information carried on the PDCCH.

14 Claims, 5 Drawing Sheets

(51) Int. Cl.
*H04W 52/02* (2009.01)
*H04W 72/12* (2009.01)

(58) Field of Classification Search
CPC ......... H04W 52/0212; H04W 52/0216; H04W 52/0229; H04W 72/042; H04W 72/1289; H04W 4/90; H04L 5/0053; H04L 5/0091; H04L 5/0023; H04L 5/0048; Y02D 30/70
See application file for complete search history.

(56) References Cited

U.S. PATENT DOCUMENTS

| | | | |
|---|---|---|---|
| 2013/0182626 A1 | 7/2013 | Kuo | |
| 2014/0016598 A1 | 1/2014 | Kwon et al. | |
| 2015/0131599 A1* | 5/2015 | Xue | H04W 72/042 370/329 |
| 2018/0317198 A1* | 11/2018 | Lee | H04L 5/0053 |
| 2019/0110179 A1* | 4/2019 | Lee | H04W 48/12 |
| 2019/0239187 A1* | 8/2019 | Islam | H04L 5/0094 |

FOREIGN PATENT DOCUMENTS

| | | |
|---|---|---|
| WO | 2014015479 A1 | 1/2014 |
| WO | 2017079574 A1 | 5/2017 |

OTHER PUBLICATIONS

LG Electronics, "Paging design in NR", 3GPP TSG RAN WG1 Meeting #92bis; R1-1804537, Apr. 16-20, 2018, 5 pages, Sanya, China.

Ericsson, "Summary of 7.1.3.1.4(DCI contents and formats", 3GPP TXG-RAN WG1 #92, R1-1803232, Feb. 26-Mar. 2, 2018, 19 pages, Athens, Greece.

3rd Generation Partnership Project;Technical Specification Group Radio Access Network; NR; Multiplexing and channel coding (Release 15); 3GPP TS 38.212 V15.1.1 (Apr. 2018), 94 pages.

Huawei et al., "Multi-beam Paging for NR", 3GPP TSG RAN WG1 Meeting #88 R1-1701723, Athens, Greece, Feb. 13-17, 2017, 4 pages.

Huawei et al., "Multi-beam Paging for NR", 3GPP TSG RAN WG1 Meeting #88bis R1-1704189, Spokane, WA, USA, Apr. 3-7, 2017, 3 pages.

Huawei et al., "Multi-beam Paging for NR", 3GPP TSG RAN WG1 Meeting #89 R1-1706975, Hangzhou, China, May 15-19, 2017, 2 pages.

Huawei et al., "Finalization of NR Paging", 3GPP TSG RAN WG1 Meeting #91 R1-1719373, Reno, NV, USA, Nov. 27-Dec. 1, 2017, 7 pages.

Qualcomm, Inc., "Reply LS on Simultaneous PDSCH Reception with Paging", 3GPP TSG RAN WG2 Meeting #101Bis R2-1806444, Sanya, China, Apr. 16-20, 2018, 1 page.

* cited by examiner

PAGING MESSAGE TRANSMISSION METHOD AND APPARATUS

CROSS-REFERENCE TO RELATED APPLICATIONS

This application is a continuation of International Application No. PCT/CN2019/086109, filed on May 9, 2019, which claims priority to Chinese Patent Application No. 201810449591.9, filed on May 11, 2018. The disclosures of the aforementioned applications are hereby incorporated by reference in their entireties.

TECHNICAL FIELD

This application relates to the field of wireless communications, and in particular, to a paging message transmission method and apparatus.

BACKGROUND

A network device may send a paging message to a terminal device in an idle mode and a terminal device in a connected mode. The paging message may be triggered by a core network, to instruct a terminal device to receive a paging request. Alternatively, the paging message may be triggered by an evolved NodeB eNodeB, to notify a terminal device of information such as system information change, an earthquake and tsunami warning system (ETWS) message, and commercial mobile alert service (CMAS) information. The system information change, ETWS, and CMAS herein may be collectively referred to as a short message in the paging message. The paging message further includes user equipment (UE) identity (ID) information, information about a network to which UE belongs, and the like. For example, in a long term evolution (LTE) system, a paging message is sent to a terminal device by a network device by using a physical downlink control channel (PDCCH) and a physical downlink shared channel (PDSCH). The terminal device first receives a PDCCH, obtains, from the PDCCH, information required for demodulating a PDSCH (for example, a time-domain location, a frequency-domain location, a modulation policy, and the like that are used for transmitting the PDSCH), and then demodulates the PDSCH to obtain the paging message from the PDSCH. For another example, during enhanced machine type communication (eMTC), a network device enables a short message or scheduling information of a paging message to be carried in downlink control information (DCI) that is carried on a PDCCH, and also adds i-bit indication information to the DCI. The indication information is used to indicate whether the short message or the scheduling information of the paging message is carried on the PDCCH. When only the scheduling information of the paging message is carried in the DCI, both the short message and UE ID information are carried on a PDSCH.

In the foregoing solutions of paging message transmission, if the short message is transmitted on the PDSCH, the UE needs to demodulate the PDCCH and/or the PDSCH. Consequently, more power consumption of the UE is caused.

SUMMARY

This application provides a paging message transmission method and apparatus, so that power consumption of a terminal device during a process of receiving a paging message can be reduced.

According to a first aspect, this application provides a paging message transmission method, where the method includes: receiving, by a terminal device, a physical downlink control channel PDCCH from a network device, where one or more types of first indication information, second indication information, a short message, and scheduling information of a paging message are carried on the PDCCH, the first indication information is used to indicate that the PDCCH carries the short message and/or the scheduling information of the paging message, and the second indication information is used to indicate whether the scheduling information is valid or whether the terminal device needs to receive a physical downlink shared channel PDSCH; and obtaining, by the terminal device based on the PDCCH, one or more types of the information carried on the PDCCH.

In the technical solution of this application, the network device sends the paging message (including the short message of the paging message and/or the scheduling information of the paging message) to the terminal device by adding the paging message to the PDCCH. In the prior art, the paging message is carried on the PDSCH and the terminal device needs to receive both the PDCCH and/or the PDSCH. However, in this application, the terminal device needs to receive only the PDCCH, and in this way, the paging message may be received. Therefore, power consumption of the terminal device can be reduced.

With reference to the first aspect, in some implementations of the first aspect, downlink control information DCI is carried on the PDCCH, and the one or more types of the first indication information, the second indication information, the short message, and the scheduling information of the paging message are carried in the DCI.

Specifically, the one or more types of the first indication information, the second indication information, the short message of the paging message, and the scheduling information of the paging message may be carried in the DCI. For example, one or more bits of a field in the DCI may be reused. When the information is carried in an existing DCI, there is no need to singly add a message or signaling, and therefore, design complexity and signaling overheads may be reduced.

With reference to the first aspect, in some implementations of the first aspect, N bits of a first field in the DCI are reused in the first indication information, K bits of a second field in the DCI are reused in the second indication information, and the first field and the second field are the same or different, where N≥1 and N is an integer, and K≥1 and K is an integer.

Herein, a value of N and a value of K may be the same or different. For example, one bit of a field in the DCI is reused in the first indication information, and one bit of another field in the DCI is reused in the second indication information. For another example, one bit of a field in the DCI is reused in the first indication information, and two bits of another field in the DCI are reused in the second indication information. For yet another example, a plurality of bits of a same field in the DCI may be reused in the first indication information and the second indication information. For example, when two bits of a field are reused, 00 represents the first indication information, 01 represents the second indication information, and the like.

It can be understood that the first indication information and the second indication information may be separately indicated by using different fields in the DCI, or may be separately indicated or jointly indicated by reusing a same field in the DCI. By using an existing field in the DCI, there is no need to redesign a field to carry the first indication information and/or the second indication information, and therefore, signaling overheads can be reduced.

With reference to the first aspect, in some implementations of the first aspect, the terminal device includes a terminal device in a connected mode and/or a terminal device in an idle mode.

According to a second aspect, this application provides a paging message transmission method, where the method includes: receiving, by a terminal device, a first physical downlink control channel PDCCH and/or a second PDCCH from a network device, where third indication information and scheduling information of a paging message are carried on the first PDCCH, and the third indication information is used to indicate whether a short message is carried on the second PDCCH; or fourth indication information and one type of a short message and scheduling information of a paging message are carried on the first PDCCH, the fourth indication information is used to indicate whether the short message or the scheduling information of the paging message is carried on the first PDCCH, and the short message is carried on the second PDCCH; and obtaining, by the terminal device based on the first PDCCH and/or the second PDCCH, one or more types of the information carried on the first PDCCH and/or the second PDCCH.

In this embodiment, in a feasible implementation, the network device may send the paging message by using two PDCCHs. Similarly, because the paging message is carried on the PDCCH, the terminal device does not need to receive a PDSCH. Therefore, power consumption of the terminal device can be reduced.

With reference to the second aspect, in some implementations of the second aspect, the obtaining, by the terminal device based on the first PDCCH and/or the second PDCCH, one or more types of the information carried on the first PDCCH and/or the second PDCCH includes: obtaining, by the terminal device, the third indication information and the scheduling information of the paging message from the first PDCCH; and when the third indication information indicates that the short message is carried on the second PDCCH, receiving, by the terminal device, the second PDCCH, and obtaining the short message from the second PDCCH, or when the third indication information indicates that the short message is not carried on the second PDCCH, skipping receiving, by the terminal device, the second PDCCH.

In other words, the third indication information is used to indicate whether the second PDCCH exists. If the third indication information indicates that the second PDCCH does not exist, it indicates that the network device may not send the short message to the terminal device, and the terminal device receives only the first PDCCH. If the third indication information indicates that the second PDCCH exists, and the short message is carried on the second PDCCH, the terminal device may also receive the second PDCCH, and obtain the short message from the second PDCCH.

Optionally, when the second PDCCH exists, the third indication information may also indicate a time-domain location and/or a frequency-domain location of the second PDCCH.

With reference to the second aspect, in some implementations of the second aspect, the terminal device includes a terminal device in a connected mode and/or a terminal device in an idle mode. The fourth indication information is used to indicate that the scheduling information of the paging message is carried on the first PDCCH, and the obtaining, by the terminal device based on the first PDCCH and/or the second PDCCH, one or more types of the information carried on the first PDCCH and/or the second PDCCH includes: obtaining, by the terminal device, the fourth indication information from the first PDCCH; and receiving, by the terminal device based on the fourth indication information, the physical downlink shared channel PDSCH, and obtaining the short message from the PDSCH.

It should be noted that, herein, when the terminal device receives the PDSCH based on the fourth indication information, it indicates that the terminal device may learn, based on the fourth indication information, that the scheduling information of the paging message other than the short message is carried on the first PDCCH, and therefore, the terminal device needs to receive the PDSCH, and obtain the short message from the PDSCH.

With reference to the second aspect, in some implementations of the second aspect, the terminal device includes a terminal device in a connected mode and/or a terminal device in an idle mode. The fourth indication information is used to indicate that the scheduling information of the paging message is carried on the first PDCCH, and the short message is carried on the second PDCCH; and the obtaining, by the terminal device based on the first PDCCH and/or the second PDCCH, one or more types of the information carried on the first PDCCH and/or the second PDCCH includes: receiving, by the terminal device, the second PDCCH, and obtaining the short message from the second PDCCH.

It should be understood that the concepts or descriptions in the method according to the first aspect and any implementation of the first aspect are also applicable in the third aspect and any implementation of the third aspect, and the concepts or descriptions in the method according to the second aspect and any implementation of the second aspect are also applicable in the fourth aspect and any implementation of the fourth aspect.

According to a third aspect, this application provides a paging message transmission method, including: sending, by a network device, a physical downlink control channel PDCCH to a terminal device, where one or more types of first indication information, second indication information, a short message, and scheduling information of a paging message are carried on the PDCCH, the first indication information is used to indicate that the PDCCH carries the short message and/or the scheduling information of the paging message, and the second indication information is used to indicate whether the scheduling information is valid or whether the terminal device needs to receive a physical downlink shared channel PDSCH.

With reference to the third aspect, in some implementations of the third aspect, downlink control information DCI is carried on the PDCCH, and the one or more types of the first indication information, the second indication information, the short message, and the scheduling information of the paging message are carried in the DCI.

With reference to the third aspect, in some implementations of the third aspect, N bits of a first field in the DCI are reused in the first indication information, K bits of a second field in the DCI are reused in the second indication information, and the first field and the second field are the same or different, where $N \geq 1$ and N is an integer, and $K \geq 1$ and K is an integer.

According to a fourth aspect, this application provides a paging message transmission method, including: sending, by a network device, a first PDCCH and/or a second PDCCH to a terminal device, where third indication information and scheduling information of a paging message are carried on the first PDCCH, and the third indication information is used to indicate whether a short message is carried on the second PDCCH; or fourth indication information and one type of a short message and scheduling information of a paging message are carried on the first PDCCH, the fourth indication information is used to indicate whether the short message or the scheduling information of the paging message is carried on the first PDCCH, and the short message is carried on the second PDCCH.

In addition, the terminal device in the first aspect, the second aspect, the third aspect, the fourth aspect, and any possible implementation of each aspect may be a terminal device in a connected mode and/or a terminal device in an idle mode, or may be a terminal device in an inactive mode.

According to a fifth aspect, this application provides a paging message transmission apparatus, and the apparatus has functions of the terminal device for implementing the method in any one of the first aspect or possible implementations of the first aspect. These functions may be implemented by hardware, or may alternatively be implemented by executing corresponding software by hardware. The hardware or software includes one or more units that correspond to the functions.

According to a sixth aspect, this application provides a paging message transmission apparatus, and the apparatus has functions of the terminal device for implementing the method in any one of the second aspect or possible implementations of the second aspect. These functions may be implemented by hardware, or may be implemented by executing corresponding software by hardware. The hardware or software includes one or more units that correspond to the functions.

According to a seventh aspect, this application provides a paging message transmission apparatus, and the apparatus has functions of the network device for implementing the method in any one of the third aspect or possible implementations of the third aspect. These functions may be implemented by hardware, or may be implemented by executing corresponding software by hardware. The hardware or software includes one or more units that correspond to the functions.

According to an eighth aspect, this application provides a paging message transmission apparatus, and the apparatus is configured to perform functions of the network device in any one of the fourth aspect or possible implementations of the fourth aspect. These functions may be implemented by hardware, or may be implemented by executing corresponding software by hardware. The hardware or software includes one or more units that correspond to the functions.

According to a ninth aspect, this application provides a computer readable storage medium, where an instruction is stored in the computer readable storage medium. When the instruction is run on a computer, the computer is enabled to perform the method according to any one of the first aspect or possible implementations of the first aspect, or the method according to any one of the second aspect or possible implementations of the second aspect.

According to a tenth aspect, this application provides a computer readable storage medium, where an instruction is stored in the computer readable storage medium. When the instruction is run on a computer, the computer is enabled to perform the method according to any one of the third aspect or possible implementations of the third aspect, or the method according to any one of the fourth aspect or possible implementations of the fourth aspect.

According to an eleventh aspect, this application provides a chip (or a chip system), including a memory and a processor. The memory is configured to store a computer program, and the processor is configured to: invoke the computer program from the memory and run the computer program, to enable a communications device on which the chip is installed to perform the method according to any one of the first aspect and the possible implementations of the first aspect, or the method according to any one of the second aspect and the possible implementations of the second aspect.

According to a twelfth aspect, this application provides a chip (or a chip system), including a memory and a processor. The memory is configured to store a computer program, and the processor is configured to: invoke the computer program from the memory and run the computer program, to enable a communications device on which the chip is installed to perform the method according to any one of the third aspect and the possible implementations of the third aspect, or the method according to any one of the fourth aspect and the possible implementations of the fourth aspect.

Optionally, the memory and the processor may be physically independent units, or the memory may be integrated with the processor.

According to a thirteenth aspect, this application provides a computer program product, and the computer program product includes computer program code. When the computer program code is run on a computer, the computer is enabled to perform the method according to any one of the first aspect or possible implementations of the first aspect, or the method according to any one of the second aspect or possible implementations of the second aspect.

According to a fourteenth aspect, this application provides a computer program product, and the computer program product includes computer program code. When the computer program code is run on a computer, the computer is enabled to perform the method according to any one of the third aspect or possible implementations of the third aspect, or the method according to any one of the fourth aspect or possible implementations of the fourth aspect.

In the technical solutions of this application, the network device sends the paging message (including the short message of the paging message and/or the scheduling information of the paging message) to the terminal device by adding the paging message to the PDCCH. In the prior art, the paging message is carried on the PDSCH and the terminal device needs to receive both the PDCCH and/or the PDSCH. However, in this application, the terminal device needs to receive only the PDCCH; and in this way, the paging message may be received.

Therefore, power consumption of the terminal device can be reduced.

DETAILED DESCRIPTION OF ILLUSTRATIVE EMBODIMENTS

The technical solutions of this application are described below with reference to accompanying drawings.

Figure 1:
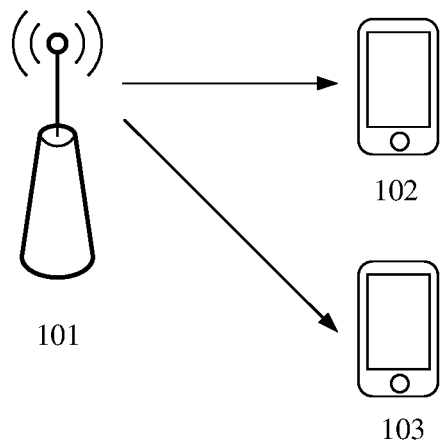
FIG. 1 shows a wireless communications system 100 applicable to an embodiment of this application.

FIG. 1 shows a wireless communications system 100 applicable to an embodiment of this application. The wireless communications system may include at least one network device and one or more user equipment. The network device (denoted as 101 in FIG. 1) may communicate with the one or more user equipment (denoted as 102 and 103 in FIG. 1) in a wireless manner. The network device 101 may be a base station, may be a device into which a base station and a base station controller are integrated, or may be another device having a similar communication function.

The wireless communications system in this embodiment of this application includes but is not limited to: a narrowband Internet of Things (NB-IoT) system, a global system for mobile communications (GSM), an enhanced data rates for GSM evolution (EDGE) system, a wideband code division multiple access (WCDMA) system, a code division multiple access 2000 (CDMA 2000) system, a time division-synchronous code division multiple access (TD-SCDMA) system, a long term evolution (LTE) system, three main application scenarios of a next generation 5G mobile communications system: enhanced mobile broadband (eMBB), ultra-reliable and low-latency communications (URLLC), and enhanced machine type communication (eMTC), or a new communications system in the future.

The base station (BS) in this embodiment of this application device may also be referred to as a base station device, and is a network device. The base station may have different names in different wireless access systems. For example, a base station in a universal mobile telecommunications system (UMTS) network is referred to as a NodeB (NodeB), a base station in an LTE network is referred to as an evolved NodeB (evolved NodeB, eNB, or eNodeB), and a base station in a new radio (NR) network is referred to as a transmission reception point (TRP) or a next generation NodeB (gNB). A base station in another network in which a plurality of technologies are integrated, or in various evolved networks may also have another name. This is not limited in this application.

The terminal device in this embodiment of this application is also referred to as user equipment (UE) that is a device having a communication function, and may include a handheld device having a wireless communication function, a vehicle-mounted device, a wearable device, a computing device, another processing device that is connected to a wireless modem, or the like. The UE may be deployed on land, including indoors or outdoors, or may be handheld or vehicle-mounted; or may be deployed on a water surface (for example, a ship), or may be deployed in the air (for example, an airplane, a balloon, or a satellite). The UE may also be referred to as a terminal device, and may be a mobile phone, a tablet computer, a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The terminal may have different names in different networks, such as user equipment, a mobile station, a subscriber unit, a station, a cellular phone, a personal digital assistant, a wireless modem, a wireless communications device, a handheld device, a laptop computer, a cordless phone, and a wireless local loop. For ease of description, the terminal device is briefly referred to as UE in the following embodiments.

Related concepts used in the embodiments of this application are first briefly described.

A network device may initiate paging to UE in an idle mode or a connected mode, and a paging process may be triggered by a core network and is used to instruct UE to receive a paging request. Alternatively, the paging process may be triggered by an eNodeB, and is used to notify system information change and instruct the UE to receive information such as ETWS information and CMAS information. Before receiving a paging message, the UE needs to first monitor a PDCCH, and determine, depending on whether a P-RNTI is carried on the PDCCH, whether the paging message is sent to the UE from the network device in a current paging cycle. A process in which the UE receives the paging message belongs to a type of discontinuous reception (DRX), and the discontinuous reception indicates that the UE monitors, only when the UE needs to receive the paging message, a PDCCH subframe scrambled with the P-RNTI, to reduce power consumption. Correspondingly, the network device only needs to deliver the paging message at a specific paging time instead of sending the paging message in each downlink subframe. However, the UE cannot know when the network device delivers the paging message, and therefore, blind detection needs to be cyclically performed on the PDCCH subframe scrambled with the P-RNTI.

In the prior art, parameters of a paging frame (PF) and a paging occasion (PO) are used to indicate a time at which the network device sends the paging message. The PF indicates a number of a system frame in which the paging message is transmitted. The PO indicates a number of a subframe in a PF in which the paging message is transmitted. Therefore, in a DRX cycle, the UE only needs to first monitor, in a PO of the corresponding PF, whether a P-RNTI is carried on the PDCCH, and then determines whether the paging message is carried on a corresponding PDSCH. If the P-RNTI is carried on the PDCCH, the UE receives the PDSCH based on a related parameter that is used for demodulating the PDSCH and that is indicated on the PDCCH, and obtains the paging message carried on the PDSCH. If no P-RNTI is obtained after the UE parses the PDCCH, the UE does not need to receive the PDSCH, and the UE may enter a sleep mode based on the DRX cycle, to reduce power consumption.

A method in which the UE calculates the PF and the PO is provided below.

For calculation of the PF, refer to Formula (1):

$$SFN \bmod T = (T/N) \cdot (UE\_ID \bmod N) \qquad (1).$$

In Formula (1), SFN represents a system frame number, and T represents a DRX cycle or a paging cycle. N=min(T, nB), where nB represents a quantity of POs in one DRX cycle or paging cycle. In addition, a value of the SFN ranges from 0 to 1023. A value of T is 32, 64, 128, or 256, and T is expressed in radio frames. A value of nB is 4T, 2T, T, T/2, T/4, T/8, T/16, or T/32, and nB is expressed in radio frames. UE_ID=IMSI mod 1024. Herein, the IMSI refers to international mobile subscriber identity (international mobile subscriber identity).

For calculation of the PO, refer to Formula (2):

$$i\_s = \text{floor}(UE\_ID/N) \bmod N_s \quad (2).$$

In Formula (2), $N_s = \max(1, nB/T)$, and a value of $N_s$ is 1, 2, or 4. Therefore, a value of i_s is 0, 1, 2, or 3.

Based on a definition in an LTE standard, there is a mapping relationship between i_s and the PO. A location of a PO subframe is determined jointly based on an LTE standard type (FDD or TDD), the parameter NS and the parameter i_s. FDD is used as an example in Table 1 below.

TABLE 1

| $N_s$ | i_s = 0 | i_s = 1 | i_s = 2 | i_s = 3 |
|---|---|---|---|---|
| 1 | 9 | N/A | N/A | N/A |
| 2 | 4 | 9 | N/A | N/A |
| 4 | 0 | 4 | 5 | 9 |

Content included in the paging message is further briefly described below.

The paging message may include two parts: One part mainly includes a system change message, an earthquake and tsunami warning system (ETWS) indication message, and a commercial mobile alert service (CMAS) indication message, which are collectively referred to as a short message in the paging message; and the other part mainly includes related information of a UE identity (hereinafter referred to as a UE ID). The paging message in this application may be a paging message including only at least one UE ID, or may be a paging message including only the short message. Alternatively, the paging message may be a paging message including both the UE ID and the short message.

In addition, the UE in this application may be UE in a connected mode, UE in an idle mode, or UE in an inactive mode.

It can be learned from the process of receiving the paging message by the UE in LTE described above that transmission of the paging message is related to the PDCCH and/or the PDSCH. The paging message is carried on the PDSCH. The UE first receives the PDCCH, and then receives the PDSCH based on information that is used for demodulating the PDSCH and that is obtained from the PDCCH, to receive the paging message from the PDSCH. In addition, in eMTC, transmission of the paging message is also related to the PDCCH and/or the PDSCH. The short message in the paging message may be carried on the PDCCH or the PDSCH. In addition, i-bit indication information is added to downlink control information (DCI) of the PDCCH, and the i-bit indication information is used to indicate whether the short message or related information for demodulating the PDSCH (also referred to as scheduling information of the PDSCH) is carried on the PDCCH. When the scheduling information of the PDSCH is carried on the PDCCH, the short message and related information of the UD ID (namely, the paging message) are carried on the PDSCH.

It can be learned that, for both LTE and eMTC that is aimed at low power consumption, when the short message of the paging message is carried on the PDSCH, the UE needs to receive the PDCCH and/or the PDSCH to receive the paging message, thereby causing relatively large power consumption of the UE.

Therefore, this application provides a paging message transmission method, to reduce power consumption of the UE during a process of receiving a paging message.

Figure 2:
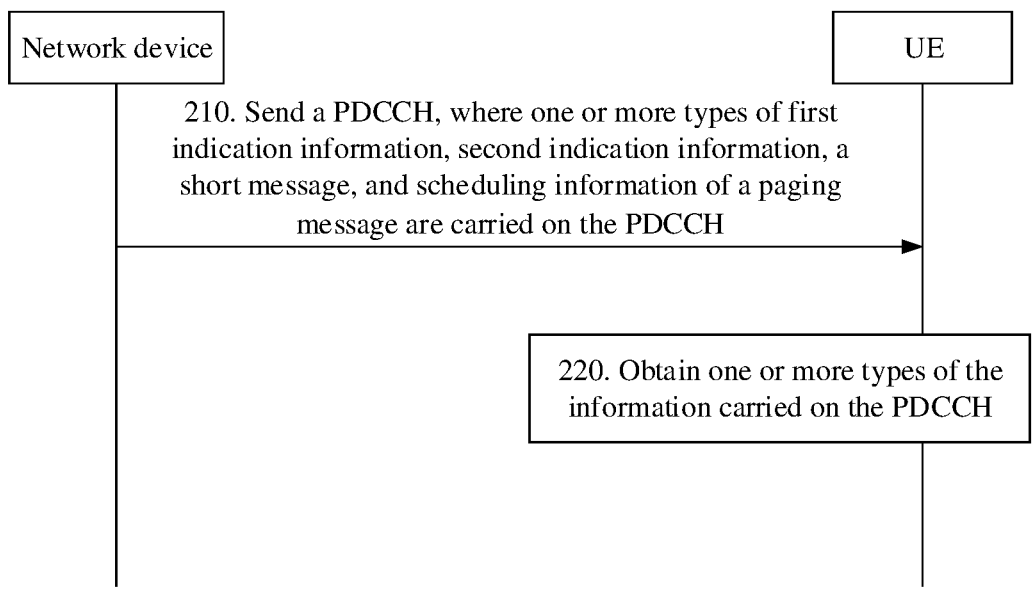
FIG. 2 shows an example of a paging message transmission method 200 applicable to this application.

FIG. 2 shows an example of a paging message transmission method 200 applicable to this application.

The paging message transmission method provided in this application is described below.

210. A network device sends a PDCCH to user equipment UE, and the UE receives the PDCCH from the network device.

One or more types of first indication information, second indication information, a short message, and scheduling information of a paging message are carried on the PDCCH. The first indication information is used to indicate whether the scheduling information of the paging message is valid and/or whether the UE needs to receive a PDSCH. Optionally, the first indication information may further indicate whether the UE needs to receive the short message. The second indication information is used to indicate that the PDCCH carries the short message and/or the scheduling information of the paging message.

The short message in this embodiment of this application specifically refers to the short message in the paging message. In other words, a system change message, an ETWS message, and a CMAS message all belong to the short message.

In addition, the scheduling information of the paging message may also be referred to as scheduling information of the PDSCH, and is related information that is required for demodulating the PDSCH and that is carried on the PDCCH. The scheduling information of the paging message may be UE ID information, or may be the short message of the paging message, or the scheduling information of the paging message is UE ID information and the short message of the paging message.

220. The UE obtains, based on the PDCCH, one or more types of the information carried on the PDCCH.

It is easy to understand that there may be a plurality of cases in which the information is carried on the PDCCH. The UE may perform different operations for different cases, and different information is also obtained from the PDCCH. The cases are separately described below.

Case 1:

The short message, the first indication information, and the scheduling information of the paging message are carried on the PDCCH.

Specifically, the short message and the scheduling information of the paging message are carried in DCI that is carried on the PDCCH.

The short message in all the following embodiments is a short message included in the paging message, and may also be referred to as a short message of the paging message.

In many cases, because the DCI used for carrying the scheduling information of the paging message is very large, overheads and bandwidth of the PDCCH are increased. If the UE reads a PDCCH having relatively large bandwidth, power consumption of the UE is certainly increased. Therefore, the first indication information is carried on the PDCCH to indicate, to the UE, whether the scheduling information, carried on the PDCCH, of the paging message is valid and/or whether the UE needs to receive (or read) the PDSCH.

It may be understood that in case 1, the UE in a connected mode may directly obtain the short message from the PDCCH, without a need to receive the PDSCH, thereby reducing the power consumption of the UE.

For the UE (the UE in an idle mode and/or the UE in a connected mode), if the first indication information indicates that the scheduling information, carried on the PDCCH, of the paging message is invalid, the UE is not to read the PDCCH. Alternatively, if the first indication information indicates that the UE does not need to receive the PDSCH, the UE is not to receive the PDSCH. Alternatively, if the first indication information indicates that the UE does not need to receive the short message, the UE is not to receive the short message. In this way, when the scheduling information of the paging message is invalid, or when the network device indicates that the UE does not need to receive the PDSCH or the short message, the power consumption of the UE can be reduced.

The first indication information may also be represented by using the first state or the last state of the scheduling information of the PDSCH, or a state between the first state and the last state. For example, the scheduling information of the PDSCH includes 10 bits, and the first indication information may be represented by using only 0 (namely, 0000000000), or the first indication information may be represented by using only 1 (namely, 1111111111), or any state between a state using only 0 and a state using only 1 is used to represent the first indication information.

Case 2:

The first indication information, the second indication information, and one type of the short message and the scheduling information of the paging message are carried on the PDCCH.

In case 2, one type of the short message and the scheduling information of the paging message may be carried on the PDCCH, and the first indication information and the second indication information may be further carried on the PDCCH.

In case 2, the second indication information is used to indicate whether the short message or the scheduling information of the paging message is carried on the PDCCH.

A person skilled in the art may understand that the short message, the first indication information, and the second indication information may be carried on the PDCCH. In this case, the second indication information specifically indicates that the short message is carried on the PDCCH. Alternatively, the scheduling information of the paging message, the first indication information, and the second indication information may be carried on the PDCCH. In this case, the second indication information specifically indicates that the scheduling information of the paging message is carried on the PDCCH.

Optionally N bits of a first field in the DCI are reused in the first indication information, K bits of a second field in the DCI are reused in the second indication information, and the first field and the second field are the same or different, where N≥1 and N is an integer.

In other words, a value of N and a value of K may be the same or different. For example, one bit of a field in the DCI is reused in the first indication information, and one bit of another field in the DCI is reused in the second indication information. For another example, one bit of a field in the DCI is reused in the first indication information, and two bits of another field in the DCI are reused in the second indication information. For still another example, a plurality of bits of a same field in the DCI may be reused in the first indication information and the second indication information. For example, when two bits of a field are reused, 00 represents the first indication information, 01 represents the second indication information, and the like.

The first indication information and the second indication information described above may be indicated by using one or more bits, or may be indicated by reusing one or more bits of a field in the DCI. Fields may include, but are not limited to, the following fields: a redundancy version, a hybrid automatic repeat request (HARQ) process number, a TPC command for PUCCH (transmission power control command for physical uplink control channel), frequency domain resource assignment, an acknowledgement/negative acknowledgement resource index (ARI), an ARI HARQ timing indicator, a carrier indicator, a bandwidth part indicator (BWP indicator), time-domain PDSCH resources, virtual resource block to physical resource block mapping (VRB-to-PRB mapping), reserved resource set on/off (reserved resource set on/off), a bundling size indicator, a modulation and coding scheme (MCS), a second codeword (second CW), a new data indicator, code block group flush indication (CBGFI), a code block group transmission indication (BGTI), a downlink assignment index (downlink assignment index), an antenna port (Antenna port(s)), and a transmission configuration indication (TCI).

In other words, the first field and the second field each may be any one of the foregoing DCI fields. The first field and the second field may be the same field or different fields.

Alternatively, the first indication information and the second indication information may also be jointly indicated. For example, the first indication information and the second indication information may be jointly indicated by reusing one or more bits of any one of the foregoing fields in the DCI. For example, 00 indicates that the short message is carried on a PDCCH, and the scheduling information of the paging message is invalid; 01 indicates that the scheduling information of the paging message is carried on the PDCCH, and the scheduling information of the paging message is valid; 10 indicates that the short message is carried on the PDCCH, and the UE does not need to receive the PDSCH; and 11 indicates that the scheduling information of the paging message is carried on the PDCCH, and the UE needs to receive the PDSCH.

Figure 3:
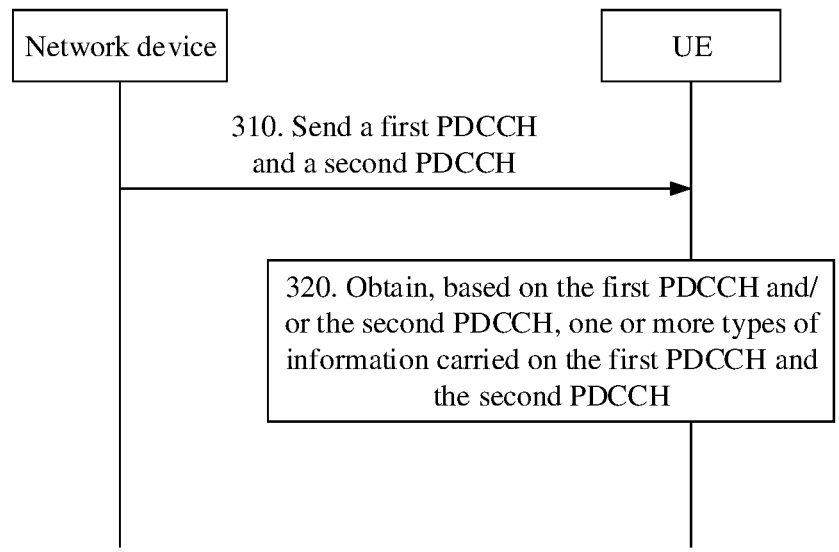
FIG. 3 shows an example of a paging message transmission method 300 applicable to this application.

FIG. 3 shows an example of a paging message transmission method 300 applicable to this application.

It should be noted that third indication information and fourth indication information in the following embodiments are merely for distinguishing from the foregoing first indication information and second indication information. Similarly, a first PDCCH and/or a second PDCCH used below are merely for distinguishing between two PDCCHs.

310. A network device sends the first PDCCH and/or the second PDCCH to UE, and the UE receives the first PDCCH and/or the second PDCCH from the network device.

In this embodiment, there are also a plurality of cases in which information is carried on the first PDCCH and/or the second PDCCH.

Case 1:

Third indication information and scheduling information of a paging message are carried on the first PDCCH.

The third indication information is used to indicate whether a short message is carried on the second PDCCH or whether the second PDCCH exists. In other words, the third indication information is used to indicate whether the second PDCCH that carries the short message exists.

In case 1, the UE (the UE in a connected mode and/or the UE in an idle mode are/is applicable) first obtains the third indication information from the received first PDCCH. Based on indication of the third indication information, if the second PDCCH that carries the short message exists, the UE further receives the second PDCCH, and obtains the short message from the second PDCCH. If the second PDCCH that carries the short message does not exist, the UE does not need to receive the second PDCCH. In other words, if the second PDCCH does not exist, the UE only needs to receive the first PDCCH.

It may be understood that if the third indication information indicates that the second PDCCH that carries the short message does not exist, it indicates that the network device may not send the short message to the UE.

Optionally, the third indication information may also indicate a location of the second PDCCH, including a time-domain location and/or a frequency-domain location of the second PDCCH. When the third indication information indicates the time-domain location of the second PDCCH, indication may be performed based on a slot, or may be performed based on a PO. Any one of 1-bit data to 30-bit data may be used to indicate a slot location in which the second PDCCH is located. For example, the third indication information indicates that the second PDCCH is in a $K^{th}$ slot or subframe or symbol following or prior to a current PDCCH. A value of K may be any one of 1 to 360. The value of K may be determined based on an SCS. For example, when the SCS is 15 kHz, a value of K may range from 1 to 40. When the SCS is 30 kHz, the value of K may range from 1 to 80. When the SCS is 60 kHz, the value of K may range from 1 to 160. When the SCS is 30 kHz, the value of K may range from 1 to 320. For another example, the third indication information indicates that the second PDCCH is in an $M^{th}$ PO following or prior to a current PO, where a value of M may be any one of 1 to 1024.

Case 2:

Fourth indication information and one type of the short message and the scheduling information of the paging message are carried on the first PDCCH, and the short message is carried on the second PDCCH.

The fourth indication information is used to indicate whether the short message or the scheduling information of the paging message is carried on the first PDCCH.

In case 2, the UE in the connected mode directly reads the second PDCCH and obtains the short message carried on the second PDCCH. The UE in the idle mode first reads the first PDCCH, and obtains the fourth indication information carried on the first PDCCH. If the fourth indication information indicates that the scheduling information of the paging message is carried on the first PDCCH, the UE in the idle mode obtains the scheduling information of the paging message from the first PDCCH, receives a PDSCH based on the scheduling information of the paging message, and then obtains the short message carried on the PDSCH. If the fourth indication information indicates that the short message is carried on the first PDCCH, the UE in the idle mode obtains the short message from the first PDCCH, and obtains, from the first PDCCH, information for demodulating the PDSCH. Based on the information for demodulating the PDSCH, the PDSCH is received, and UE ID information is read from the PDSCH.

In addition, the UE ID includes one or more types of an international mobile subscriber identity (IMSI), a SAE-temporary mobile subscriber identity (S-TMSI), and a UE ID of UE in an inactive mode.

Case 3:

The short message is carried on one of the first PDCCH and/or the second PDCCH, and the scheduling information of the paging message is carried on the other one of the first PDCCH and/or the second PDCCH.

The UE in the connected mode read only the PDCCH that carries the short message.

For the UE in the idle mode, the following two cases need to be considered (respectively referred to as case A and case B).

Case A:

The short message is carried only on one of the first PDCCH and/or the second PDCCH. The UE in the idle mode needs to read the first PDCCH and/or the second PDCCH to receive the UE ID information and the short message.

For example, the short message is carried on the first PDCCH, and the scheduling information of the paging message is carried on the second PDCCH. In this case, the UE in the idle mode reads the first PDCCH, and obtains the short message carried on the first PDCCH. In addition, the UE in the idle mode needs to further read the second PDCCH, obtains the scheduling information, carried on the second PDCCH, of the paging message, receives the PDSCH based on the scheduling information of the paging message, and obtains the UE ID information carried on the PDSCH.

Case B:

The short message is carried on one of the first PDCCH and/or the second PDCCH, and the UE ID information or scheduling information of the UE ID information is also carried on the PDCCH that carries the short message. The UE in the idle mode needs to read the UE ID information or scheduling information of the UE ID information from the PDCCH that carries the short message.

For example, the short message and the UE ID information are carried on the first PDCCH, and the UE in the idle mode reads the UE ID information from the first PDCCH. For another example, the short message and the scheduling information of the UE ID are carried on the first PDCCH, and the UE in the idle mode reads the scheduling information of the UE ID from the first PDCCH.

In case B, power consumption of the UE in the connected mode or the idle mode can be reduced.

The information carried on the first PDCCH and/or the second PDCCH is described above, and a transmission manner of the first PDCCH and/or the second PDCCH is described below.

In case 3, the operations performed by the UE in the idle mode and the UE in the connected mode are only used as an example. For example, in case 3, an operation performed by the UE in the idle mode is also applicable to the UE in the connected mode, and an operation performed by the UE in the connected mode is also applicable to the UE in the idle mode.

Case 4:

One or more types or all types of the short message, the scheduling information of the paging information, the third indication information, and the fourth indication information are carried on one of the first PDCCH and/or the second PDCCH, and the short message or the scheduling information of the paging message are carried on the other one of the first PDCCH and/or the second PDCCH.

For example, the third indication information, the fourth indication information, and one type of the scheduling information or the short message are carried on the first PDCCH, and the short message or the scheduling information of the paging message is carried on the second PDCCH. Specifically, it is assumed that the short message, the third indication information, and the fourth indication information are carried on the first PDCCH, the third indication information indicates that the second PDCCH exists, and the fourth indication information indicates that the short message is carried on the first PDCCH. In this case, the UE receives the first PDCCH and obtains the short message from the first PDCCH. Alternatively, the UE receives the first PDCCH, receives the second PDCCH based on the third indication information carried on the first PDCCH, and receives the scheduling information of the paging message from the second PDCCH. It is assumed that the third indication information, the fourth indication information, and the scheduling information of the paging message are carried on the first PDCCH, the third indication information indicates that the second PDCCH exists, and the fourth indication information indicates that the scheduling information of the paging message is carried on the first PDCCH. In this case, the UE receives the first PDCCH, receives the second PDCCH based on the third indication information and the fourth indication information carried on the first PDCCH, and obtains the short message from the second PDCCH. The UE receives the first PDCCH, and receives the scheduling information of the paging message from the first PDCCH based on the fourth indication information.

For another example, the third indication information and the scheduling information of the paging message are carried on the first PDCCH, and the short message is carried on the second PDCCH. The third indication information indicates that the second PDCCH exists, and also indicates a time-domain location and/or a frequency-domain location of the second PDCCH. In this case, the UE receives the first PDCCH and obtains the scheduling information of the paging message from the first PDCCH. Alternatively, the UE receives only the second PDCCH, or the UE first receives the first PDCCH, and receives the second PDCCH based on the third indication information.

For another example, the third indication information and the scheduling information of the paging message are carried on the first PDCCH, and the third indication information indicates that the second PDCCH does not exist. In this case, the UE receives the first PDCCH and obtains the scheduling information of the paging message from the first PDCCH.

For another example, the short message and the third indication information are carried on the first PDCCH, and the scheduling information of the paging message is carried on the second PDCCH.

Case 5:

The short message and indication information (denoted as fifth indication information) that indicates whether the UE needs to receive the second PDCCH are carried on the first PDCCH, and scheduling information is carried on the second PDCCH.

Optionally, the fifth indication information may also indicate the location of the second PDCCH, including the time-domain location and/or the frequency-domain location of the second PDCCH. When the fifth indication information indicates the time-domain location of the second PDCCH, indication may be performed based on a slot, or may be performed based on a PO. Any one of 1-bit data to 30-bit data may be used to indicate a slot location in which the second PDCCH is located. For example, the third indication information indicates that the second PDCCH is in a $K^{th}$ slot or subframe or symbol following or prior to a current PDCCH. A value of K may be any one of 1 to 360. The value of K may be determined based on SCS. For example, when the SCS is 15 kHz, a value of K may range from 1 to 40. When the SCS is 30 kHz, the value of K may range from 1 to 80. When the SCS is 60 kHz, the value of K may range from 1 to 160. When the SCS is 30 kHz, the value of K may range from 1 to 320. For another example, the third indication information indicates that the second PDCCH is in an $M^{th}$ PO following or prior to a current PO, where a value of M may be any one of 1 to 1024.

In this case, the UE may receive only the first PDCCH and obtain the short message from the first PDCCH. Alternatively, the UE may first receive the first PDCCH and obtain the fifth indication information. If the fifth indication information indicates that the UE needs to receive the second PDCCH, the UE is to further receive the second PDCCH. If the fifth indication information indicates that the UE does not need to receive the second PDCCH, the UE is to not receive the second PDCCH.

Alternatively, the scheduling information of the paging message and indication information (namely, fifth indication information) that indicates whether the UE needs to receive the second PDCCH are carried on the first PDCCH, and the short message is carried on the second PDCCH.

In this case, the UE may receive only the second PDCCH. Alternatively, the UE may first receive the first PDCCH and/or then determine, based on the fifth indication information, whether to receive the second PDCCH. Alternatively, the UE may receive the first PDCCH and obtain the scheduling information, carried on the first PDCCH, of the paging message.

Case 6:

The first indication information, the indication information that indicates whether the UE needs to receive the second PDCCH, and one type of the short message and the scheduling information of the paging message are carried on the first PDCCH, and the short message or the scheduling information of the paging message is carried on the second PDCCH.

The first indication information is used to indicate whether the scheduling information of the paging message is valid and/or whether the UE needs to receive the PDSCH.

Case 7:

The indication information that indicates whether the UE needs to receive the second PDCCH, and one type of the short message and the scheduling information of the paging message are carried on the first PDCCH, and the short message or the scheduling information of the paging message is carried on the second PDCCH.

For example, the short message and indication information indicating whether the UE needs to receive the second PDCCH are carried on the first PDCCH, and the scheduling information of the paging message is carried on the second PDCCH. In this case, the UE receives the first PDCCH and obtains the short message from the first PDCCH. Alternatively, the UE receives the first PDCCH, receives the second PDCCH based on the indication information carried on the first PDCCH, and receives the scheduling information of the paging message from the second PDCCH.

For another example, the scheduling information of the paging message and the indication information indicating whether the UE needs to receive the second PDCCH are carried on the first PDCCH, and the short message is carried on the second PDCCH. In this case, the UE receives only the second PDCCH and obtains the short message from the second PDCCH. Alternatively, the UE receives the first PDCCH and obtains the scheduling information of the paging message from the first PDCCH.

The third indication information, the fourth indication information and/or the fifth indication information described above, and other indication information in this embodiment may be indicated by using one or more bits, or may be indicated by reusing one or more bits of a field in DCI. For the fields, refer to the examples in the method 200 described above.

It should be understood that the foregoing various cases in which the short message and the scheduling information of the paging message are carried on the first PDCCH and/or the second PDCCH are used only as some examples. Based on the design idea provided in this application, a person skilled in the art easily figures out that the short message, the scheduling information of the paging message, and various types of indication information (for example, the first indication information, the second indication information, the third indication information, the fourth indication information, and the fifth indication information) are carried on the first PDCCH and/or the second PDCCH by using various possible combinations, which are not enumerated in this specification.

In addition, some of the technical measures of the method 200 and the method 300 may be combined for use and should not be separately split. For example, various types of indication information (for example, the third indication information and the fourth indication information) in the method 300 may be implemented by reusing one or more bits of some fields in the DCI used in the method 200. For another example, the first indication information and/or the second indication information carried on the PDCCH in the method 200 may also be used in combination with the third indication information, the fourth indication information, and the like in the method 300. This is not limited in this application.

In addition, the operations or procedures performed by the UE in the idle mode and the UE in the connected mode in various cases described in the method 200 and the method 300 are also used only as optional examples. A person skilled in the art may also figure out another feasible transformed form on the basis of the design ideas of this application. This is not limited in this application.

In step 310, the network device may first send the first PDCCH and/or then send the second PDCCH. Alternatively, the network device may first send the second PDCCH, and then send the first PDCCH.

In an implementation, the first PDCCH and/or the second PDCCH may be transmitted in a paging occasion (PO) of the paging message. The first PDCCH and/or the second PDCCH may be transmitted in a frequency division multiplexing manner or a time division multiplexing manner.

In an implementation, the first PDCCH and/or the second PDCCH may be transmitted in a same control resource set (CORESET), or may be transmitted in a same search space. In this case, the first PDCCH and/or the second PDCCH may be distinguished from each other by using different paging radio network temporary identifiers (P-RNTI).

In an implementation, the first PDCCH and/or the second PDCCH may be indicated by using a data bit in the DCI, to distinguish the first PDCCH from the second PDCCH. For example, one bit may be used for indication.

In an implementation, the first PDCCH and/or the second PDCCH may be indicated by reusing a field in the DCI. For a usable field, refer to the description in the embodiment corresponding to FIG. 2.

In an embodiment, the first PDCCH and/or the second PDCCH may be transmitted together by using a same beam through sweeping. In other words, the first PDCCH and/or the second PDCCH are simultaneously transmitted. The first PDCCH and/or the second PDCCH may also be separately transmitted through sweeping.

In an embodiment, a transmission location of the first PDCCH is fixed. Alternatively, a transmission location of the second PDCCH is fixed. For example, the first PDCCH and/or the second PDCCH may be transmitted in a corresponding PO, or may be transmitted in a same slot, or may be transmitted in different slots.

A relative location (including a time-domain location and/or a frequency-domain location) of the first PDCCH and/or the second PDCCH may be fixed and stipulated in a protocol, or may also be pre-agreed on by the network device and the UE. For example, after one of the first PDCCH and/or the second PDCCH is transmitted by the network device through beam sweeping, the other is transmitted in an immediately adjacent location. The immediately adjacent herein may be used to describe adjacent slots, adjacent symbols, adjacent subframes, adjacent system frames, or adjacent half system frames. For another example, after one of the first PDCCH and/or the second PDCCH is transmitted by the network device through beam sweeping, the other is transmitted after an interval time. The interval time may be any one or more of 1 slot to 80 slots.

In an implementation, any one of the first PDCCH and/or the second PDCCH may not be transmitted in a PO. For example, the first PDCCH is cyclically transmitted. The cycle may be a discontinuous reception (DRX) cycle configured by the network device, or may be a minimum DRX cycle or a fractional multiple of a DRX cycle. For example, there are two occasions for transmitting the first PDCCH in one DRX cycle, and the occasions may be a time period in which a base station performs beam sweeping once for transmission. The DRX cycle may be N times a transmission cycle of the short message, and values of N may be some or all of 1, 2, 4, 8, 16, 32, 64, 128, 256, 512, and 1024. The second PDCCH is cyclically transmitted in a similar manner.

In an implementation, the first PDCCH and/or the second PDCCH may be transmitted based on different bandwidth parts (BWP). Different information may be carried on PDCCHs that are transmitted in a same PO by using different BWPs. Any combination of various types of information may be carried on a PDCCH (for example, the PDCCH in the method 200 or the first PDCCH and/or the second PDCCH in the method 300) that is transmitted on an initial BWP. One or more types of the short message, the first indication information, the second indication information, the third indication information, the fourth indication information, and the fifth indication information may be included in a PDCCH transmitted on a BWP of the UE. For example, only the short message may be included.

The first PDCCH and/or the second PDCCH may be transmitted based on different control resource sets. The first PDCCH and/or the second PDCCH may be transmitted on the initial BWP, or may be transmitted on a BWP dedicated to the paging message, or may be transmitted on a BWP on which the paging message is reused with another message and/or other information. When the network device configures a BWP of the paging message, one or more bits may be used to indicate that the BWP is the initial BWP, or the BWP dedicated to the paging message; one or more bits may be used to indicate that the BWP of the paging message is the BWP on which the paging message is reused with other information, or the BWP dedicated to the paging message; one or more bits may be used to indicate that the BWP of the paging message may be the BWP on which the paging message is reused with other information, or the initial BWP; one or more bits may be used to indicate that the BWP of the paging message is the BWP dedicated to the paging message, or the BWP on which the paging message is reused with other information, or the initial BWP; or the BWP may be agreed on by the network device and the UE. The BWP of the paging message may be the BWP dedicated to the paging message, the initial BWP, or the BWP on which the paging message is reused with another message and/or other information. The other information herein may be system information and random access information. The initial BWP may also be referred to as an initial active BWP, or a BWP that includes a control resource set of a SIB 1.

Optionally, configuration information used by the network device to configure the BWP of the paging message may be installed in the system information block 1 (SIB 1). For example, the network device may use one or more bits in the SIB 1 to indicate that the BWP of the paging message is one of the BWP dedicated to the paging message and the initial BWP; or may indicate that the BWP of the paging message may be one of the BWP dedicated to the paging message, the initial BWP, or the BWP on which the paging message is reused with another message and/or other information.

In an implementation, the transmission cycle of the first PDCCH and/or the transmission cycle of the second PDCCH may be equal to a cycle of a synchronization signal/physical broadcast channel block (SS/PBCH block).

In an implementation, within one PDCCH cycle for the paging message, there may be a plurality of POs, or a plurality of occasions of a PDCCH for transmitting a paging message, or an occasion of a plurality of PDCCHs for transmitting a paging message. Locations of the plurality of POs may be configured by the network device, may be obtained by looking up a table (for example, Table 1 shown above), or may be fixed. Alternatively, locations of the plurality of POs may also be derived from another parameter. For example, the locations of the plurality of POs may be derived from a quantity of paging occasions. A starting position of the cycle may be a current frame of the SS/PBCH block, a next frame of the SS/PBCH block, a current half-frame of the SS/PBCH block, or a next half-frame of the SS/PBCH block. Alternatively, it may be specified that the first frame in each cycle is used as the starting position, or a frame in which SFN=0 is set as the starting position of the cycle. A location of a PO is derived from a formula: SFN mod T=((T div N)*(UE_ID mod N)+Offset_SSB+Offset_SSBIndex)mod T, where T is a DRX cycle of a terminal device or a network device, and N is a quantity of paging frames, and the quantity of paging frames may be configured by the network device, or may be calculated based on a quantity of paging occasions and the DRX cycle, or may be derived based on a cycle of an SSB and a quantity of paging occasions. For example, N represents a quantity of cycles of an SSB in T or an amount of measurement time and configuration duration of the SS/PBCH block. Offset_SSBIndex may not exist, or may be a frame in which a paging message corresponding to an $i^{th}$ SS/PBCH block index is located. Offset_SSB may be configured, or may be a frame in which the SS/PBCH block is located, or may be a $k^{th}$ frame following or prior to the frame in which the SS/PBCH block is located, or a $k^{th}$ frame following or prior to a start frame in which the measurement time configuration of the SS/PBCH block is located, where a value of k may be any one of 1 to 16. A starting position of the PO in the frame may be aligned with a start slot or a start subframe of the SS/PBCH block, or may be the first subframe after or before transmission of the SS/PBCH block ends, or may be a start slot or a start subframe in which the measurement time configuration of the SS/PBCH block is located, or may be the first start slot or a start subframe after or before a measurement time configuration window of the SS/PBCH block ends. For example, if a start slot of the measurement time configuration window of the SS/PBCH block is one slot and duration is four slots, the PO may start from the fifth slot.

In an implementation, the first PDCCH and/or the second PDCCH may have a quasi co-located (QCL) relationship with a cell-defining SS/PBCH block, may have a QCL relationship with a non-cell-defining SS/PBCH block, or may have a QCL relationship with a channel state information-reference signal (CSI-RS). In other words, the first PDCCH and/or the second PDCCH have a QCL relationship with the cell-defining SS/PBCH block, the non-cell-defining SS/PBCH block, or the CSI-RS.

For a concept of QCL, refer to the prior art.

A PDCCH for carrying the short message may determine a QCL relationship of the PDCCH based on bandwidth. One manner is that when the UE is on an initial bandwidth part (BWP), the PDCCH may have a QCL relationship with the cell-defining SS/PBCH block. The network device transmits the first PDCCH and/or the second PDCCH based on the QCL relationship.

Specifically, when the BWP of the UE includes a cell-defining SS/PBCH block and a non-cell-defining SS/PBCH block, the network device sends the PDCCH to the UE based on the QCL relationship between the PDCCH and either of the cell-defining SS/PBCH block and the non-cell-defining SS/PBCH. When the BWP of the UE includes only the non-cell-defining SS/PBCH block, the network device sends the PDCCH based on the QCL relationship between the PDCCH and the non-cell-defining SS/PBCH block or the CSI-RS. When the BWP of the UE includes no SS/PBCH block, the network device sends the PDCCH to the UE based on the QCL relationship between the PDCCH and the CSI-RS.

Correspondingly, the UE may transmit the PDCCH based on a corresponding QCL relationship. For example, the UE may transmit the PDCCH based on only the QCL relationship between the cell-defining SS/PBCH block and the PDCCH, or only the QCL relationship between the non-cell-defining SS/PBCH block and the PDCCH, or only the QCL relationship between the PDCCH and the CSI-RS.

It should be noted that, in this embodiment with a QCL relationship, the PDCCH may be the foregoing first PDCCH and/or second PDCCH.

Alternatively, in this embodiment with a QCL relationship, the PDCCH may be a PDSCH.

The process in which the network device transmits the first PDCCH and/or the second PDCCH is briefly described above.

It should be understood that the foregoing implementations can be combined with each other.

As described in step 210 in the foregoing embodiment, the first indication information, the second indication information, the third indication information, the fourth indication information, and the fifth indication information may be indicated by reusing the field in the DCI.

320. The UE obtains, based on the first PDCCH and/or the second PDCCH, one or more types of the information carried on the first PDCCH and/or the second PDCCH.

For clarity of the solution, for each case in step 310, processes in which the UE obtains one or more types of the information carried on the first PDCCH and/or the second PDCCH (namely, step 320) are separately described with respect to each case. Therefore, for step 320, refer to the description in step 310. Details are not described herein again.

In addition, it is easy to understand that, in the paging message transmission method 200, the network device sends the paging message to the UE by using one PDCCH, and therefore, the PDCCH is not numbered. However, in the paging message transmission method 300, the network device may send the paging message to the UE by using two PDCCHs. For ease of distinction, the two PDCCHs are respectively numbered as the first PDCCH and/or the second PDCCH. A person skilled in the art may know that when one of the first PDCCH or the second PDCCH in the method 300 is singly described, the first PDCCH or the second PDCCH represents a same meaning as the PDCCH in the method 200, and only the information carried on the first PDCCH or the information carried on the second PDCCH in the method 300 may be different from (or may be the same as) the information carried on the PDCCH in the method 200. The first PDCCH or the second PDCCH in the method 300 and the PDCCH in the method 200 have no difference in physical meanings, and both represent a physical downlink control channel.

The paging message transmission methods in the embodiments of this application are described above in detail, and the paging message transmission apparatuses used in the embodiments of this application are described below.

Figure 4:
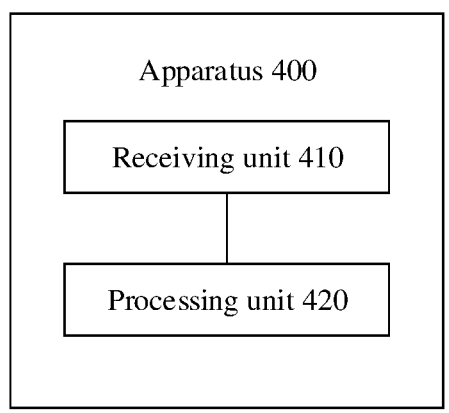
FIG. 4 is a schematic structural block diagram of a paging message transmission apparatus 400 according to an embodiment of this application.

FIG. 4 is a schematic structural block diagram of a paging message transmission apparatus 400 according to an embodiment of this application. As shown in FIG. 4, the apparatus 400 includes a receiving unit 410 and a processing unit 420.

The receiving unit 410 is configured to receive a physical downlink control channel PDCCH from a network device, where one or more types of first indication information, second indication information, a short message, and scheduling information of a paging message are carried on the PDCCH. The first indication information is used to indicate that the PDCCH carries the short message and/or the scheduling information of the paging message, and the second indication information is used to indicate whether the scheduling information is valid or whether the apparatus needs to receive a physical downlink shared channel PDSCH.

The processing unit 420 is configured to obtain, based on the PDCCH, one or more types of the information carried on the PDCCH.

Other operations or functions of the units in the apparatus 400 in this embodiment of this application are respectively used to implement corresponding operations and/or procedures performed by the terminal device (namely, UE) in the paging message transmission method 200 in this embodiment of this application. For brevity, details are not described herein again.

Optionally, the apparatus 400 may be the UE in the paging message transmission method 200 in this application, or may be a chip (or a chip system) installed in the UE. For example, the receiving unit of the apparatus 400 may be a transceiver 603 in a terminal device 600 shown in FIG. 6, and the processing unit may be a processor 601 in the terminal device 600.

Figure 5:
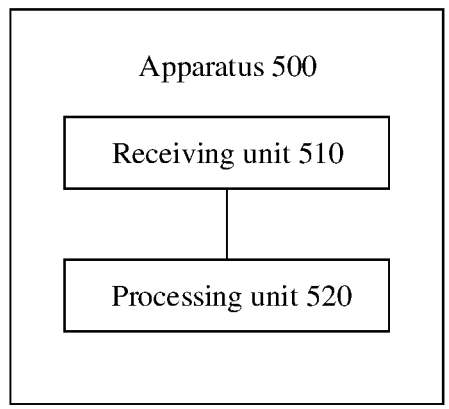
FIG. 5 is a schematic structural block diagram of a paging message transmission apparatus 500 according to an embodiment of this application.

FIG. 5 is a schematic structural block diagram of a paging message transmission apparatus 500 according to an embodiment of this application. As shown in FIG. 5, the apparatus 500 includes a receiving unit 510 and a processing unit 520.

The receiving unit 510 is configured to receive a first physical downlink control channel PDCCH and/or a second PDCCH from a network device, where third indication information and scheduling information of a paging message are carried on the first PDCCH, and the third indication information is used to indicate whether a short message is carried on the second PDCCH, or fourth indication information and one type of a short message and scheduling information of a paging message are carried on the first PDCCH, the fourth indication information is used to indicate whether the short message or the scheduling information of the paging message is carried on the first PDCCH, and the short message is carried on the second PDCCH.

The processing unit 520 is configured to obtain, based on the first PDCCH and/or the second PDCCH, one or more types of the information carried on the first PDCCH and/or the second PDCCH.

Other operations or functions of the units in the apparatus 500 in this embodiment of this application are respectively used to implement corresponding operations and/or procedures performed by the terminal device (namely, UE) in the paging message transmission method 300 in the embodiment of this application. For brevity, details are not described herein again.

Optionally, the apparatus 500 may be the UE in the paging message transmission method 300 in this application, or may be a chip (or a chip system) installed in the UE. For example, the receiving unit of the apparatus 500 may be a transceiver 703 in a terminal device 700 shown in FIG. 7, and the processing unit may be a processor 701 in the terminal device 700.

Figure 6:
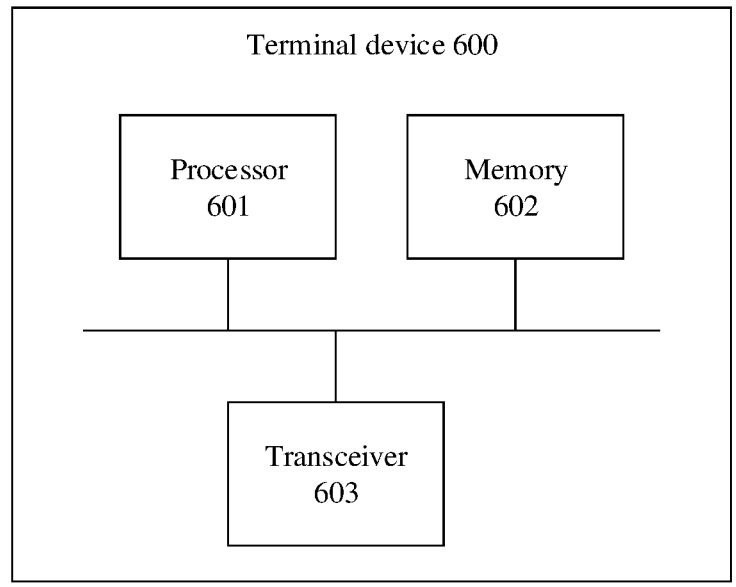
FIG. 6 is a schematic structural block diagram of a terminal device 600 for transmitting a paging message according to an embodiment of this application.

FIG. 6 is a schematic structural diagram of a terminal device 600 according to an embodiment of this application. As shown in FIG. 6, user equipment 600 includes one or more processors 601, one or more memories 602, and one or more transceivers 603. The processor 601 is configured to control the transceiver 603 to transmit and receive a signal, the memory 602 is configured to store a computer program, and the processor 601 is configured to: invoke the computer program from the memory 602 and run the computer program, to enable the terminal device 600 to perform corresponding procedures and/or operations performed by the terminal device (namely, UE) in the paging message transmission method 200 in this application. For brevity, details are not described herein again.

Figure 7:
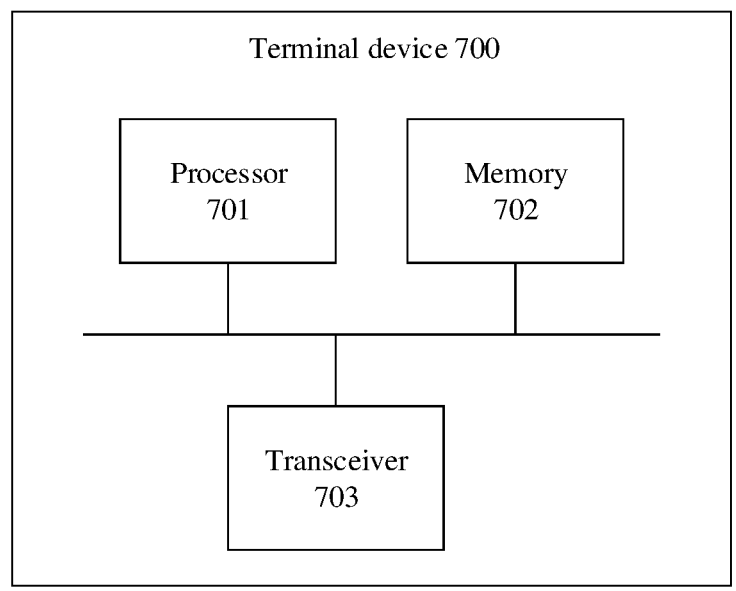
FIG. 7 is a schematic structural block diagram of a terminal device 700 for transmitting a paging message according to an embodiment of this application.

FIG. 7 is a schematic structural diagram of a terminal device 700 according to an embodiment of this application. As shown in FIG. 7, user equipment 700 includes one or more processors 701, one or more memories 702, and one or more transceivers 703. The processor 701 is configured to control the transceiver 703 to transmit and receive a signal, the memory 702 is configured to store a computer program, and the processor 701 is configured to: invoke the computer program from the memory 702 and run the computer program, to enable the terminal device 700 to perform corresponding procedures and/or operations performed by the terminal device (namely, UE) in the paging message transmission method 300 in this application. For brevity, details are not described herein again.

Figure 8:
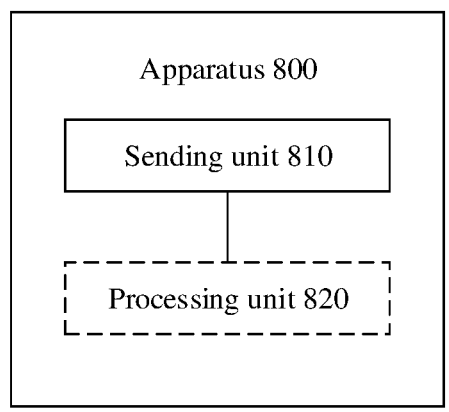
FIG. 8 is a schematic structural block diagram of a paging message transmission apparatus 800 according to an embodiment of this application.

FIG. 8 is a schematic structural block diagram of a paging message transmission apparatus 800 according to an embodiment of this application. As shown in FIG. 8, the apparatus 800 includes a sending unit 810.

The sending unit 810 is configured to send a PDCCH to user equipment UE, where one or more types of first indication information, second indication information, a short message, and scheduling information of a paging message are carried on the PDCCH The first indication information is used to indicate that the PDCCH carries the short message and/or the scheduling information of the paging message, and the second indication information is used to indicate whether the scheduling information is valid or whether the UE needs to receive a physical downlink shared channel PDSCH.

Further, the apparatus 800 may further include a processing unit 820, configured to process data and/or information exchanged between the apparatus 800 and the UE.

Other operations or functions of the units in the apparatus 800 in this embodiment of this application are respectively used to implement corresponding operations and/or procedures performed by the network device in the paging message transmission method 200 in the embodiment of this application. For brevity, details are not described herein again.

Optionally, the apparatus 800 may be the network device in the paging message transmission method 200 in this application, or may be a chip (or a chip system) installed in the network device. For example, the sending unit 810 of the apparatus 800 may be a transceiver 1003 in a network device 1000 shown in FIG. 10 below. The processing unit 820 may be a processor 1001 of the network device 1000.

Figure 9:
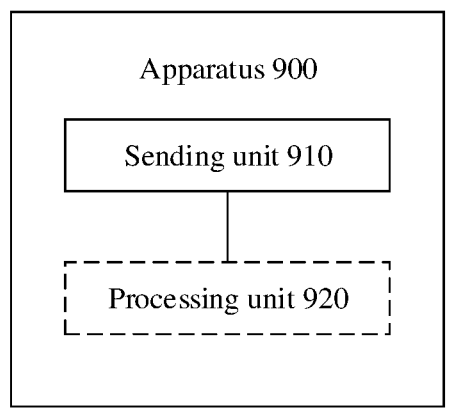
FIG. 9 is a schematic structural block diagram of a paging message transmission apparatus 900 according to an embodiment of this application.

FIG. 9 is a schematic structural block diagram of a paging message transmission apparatus 900 according to an embodiment of this application. As shown in FIG. 9, the apparatus 900 includes a sending unit 910.

The sending unit 910 is configured to send a first PDCCH and/or a second PDCCH to UE.

Third indication information and scheduling information of a paging message are carried on the first PDCCH, and the third indication information is used to indicate whether a short message is carried on the second PDCCH.

Alternatively, fourth indication information and one type of a short message and scheduling information of a paging message are carried on the first PDCCH, the fourth indication information is used to indicate whether the short message or the scheduling information of the paging message is carried on the first PDCCH, and the short message is carried on the second PDCCH.

Further, the apparatus 900 may further include a processing unit 920, configured to process data and/or information exchanged between the apparatus 900 and the UE.

It should be noted that the processing unit 820 of the apparatus 800 shown in FIG. 8 and the processing unit 920 of the apparatus 900 shown in FIG. 9 are separately shown in a dashed-line box, indicating that the processing unit 820 and the processing unit 920 are not described in the steps of the corresponding embodiment.

Other operations or functions of the units in the apparatus 900 in this embodiment of this application are respectively used to implement corresponding operations and/or procedures performed by the network device in the paging message transmission method 300 in the embodiment of this application. For brevity, details are not described herein again.

Optionally, the apparatus 900 may be the network device in the paging message transmission method 300 in this application, or may be a chip (or a chip system) installed in the network device. For example, the sending unit 910 of the apparatus 900 may be a transceiver 2003 in a network device 2000 shown in FIG. 11 below. The processing unit 920 may be a processor 2001 of the network device 2000.

Figure 10:
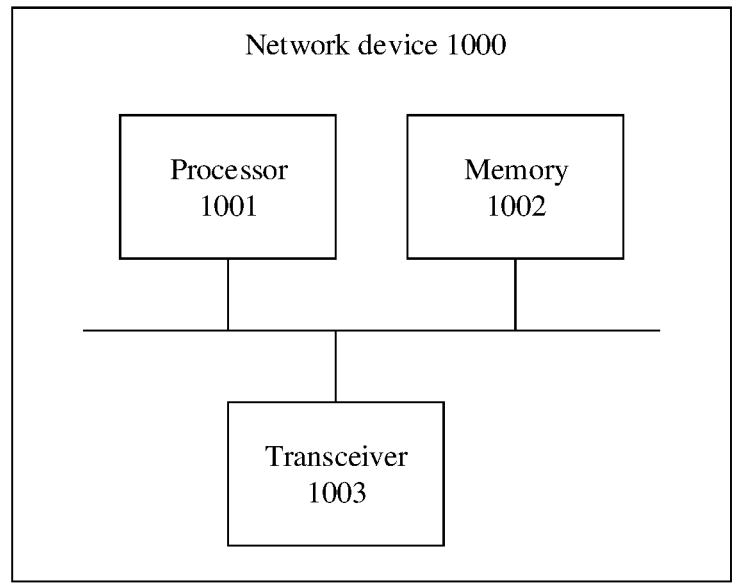
FIG. 10 is a schematic structural block diagram of a network device 1000 for transmitting a paging message according to an embodiment of this application.

FIG. 10 is a schematic structural diagram of a network device 1000 according to an embodiment of this application. As shown in FIG. 10, user equipment 1000 includes one or more processors 1001, one or more memories 1002, and one or more transceivers 1003. The processor 1001 is configured to control the transceiver 1003 to transmit and receive a signal, the memory 1002 is configured to store a computer program, and the processor 1001 is configured to: invoke the computer program from the memory 1002 and run the computer program, to enable the network device to perform corresponding procedures and/or operations performed by the network device in the paging message transmission method 200 in this application. For brevity, details are not described herein again.

Figure 11:
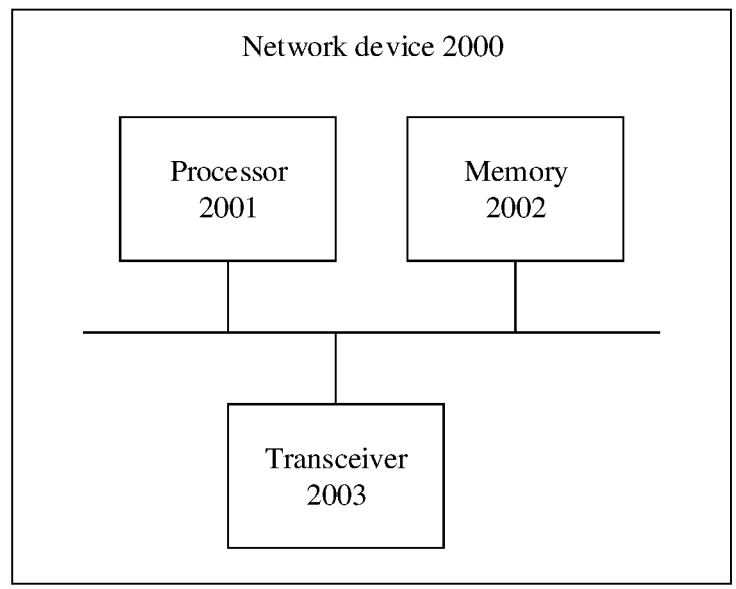
FIG. 11 is a schematic structural block diagram of a network device 2000 for transmitting a paging message according to an embodiment of this application.

FIG. 11 is a schematic structural diagram of a network device 2000 according to an embodiment of this application. As shown in FIG. 11, the network device 2000 includes one or more processors 2001, one or more memories 2002, and one or more transceivers 2003. The processor 2001 is configured to control the transceiver 2003 to transmit and receive a signal, the memory 2002 is configured to store a computer program, and the processor 2001 is configured to: invoke the computer program from the memory 2002 and run the computer program, to enable the network device to perform corresponding procedures and/or operations performed by the network device in the paging message transmission method 300 in this application. For brevity, details are not described herein again.

Both the network device and the terminal device in the foregoing apparatus embodiments correspond to the network device or the terminal device in the method embodiments, and corresponding modules or units perform corresponding steps, for example, a sending module (transmitter) performs a step of sending in the method embodiment, a receiving module (receiver) performs a step of receiving in the method embodiment, and a step other than steps of sending and receiving may be performed by a processing module (processor). For a function of a specific module, refer to the corresponding method embodiment. The sending module and the receiving module may form a transceiver module, the transmitter and the receiver may form a transceiver to jointly implement sending and receiving functions, and there may be one or more processors.

In addition, this application provides a computer readable storage medium, where the computer readable storage medium stores a computer instruction. When the computer instruction is run on a computer, the computer is enabled to perform the corresponding operations and/or procedures performed by the UE in the paging message transmission methods (method 200 and/or method 300) in the embodiments of this application.

This application further provides a computer program product, the computer program product includes computer program code. When the computer program code is run on a computer, the computer is enabled to perform the corresponding operations and/or procedures performed by the UE in the paging message transmission methods in the embodiments of this application.

This application further provides a chip (or a chip system), including a memory and a processor. The memory is configured to store a computer program, and the processor is configured to: invoke the computer program from the memory and run the computer program, to enable a communications device on which the chip is installed to perform the corresponding operations and/or procedures performed by the UE in the paging message transmission methods in the embodiments of this application.

In addition, this application provides a computer readable storage medium, where the computer readable storage medium stores a computer instruction. When the computer instruction is run on a computer, the computer is enabled to perform the corresponding operations and/or procedures performed by the network device in the paging message transmission methods (method 200 and/or method 300) in the embodiments of this application.

This application further provides a computer program product, the computer program product includes computer program code. When the computer program code is run on a computer, the computer is enabled to perform the corresponding operations and/or procedures performed by the network device in the paging message transmission methods in the embodiments of this application.

This application further provides a chip (or a chip system), including a memory and a processor. The memory is configured to store a computer program, and the processor is configured to: invoke the computer program from the memory and run the computer program, to enable a communications device on which the chip is installed to perform the corresponding operations and/or procedures performed by the network device in the paging message transmission methods in the embodiments of this application.

In the foregoing embodiments, the processor may be a central processing unit (CPU), a microprocessor, an application-specific integrated circuit (ASIC), or one or more integrated circuits configured to control program execution of programs of the solutions of this application. For example, the processor may include a digital signal processor device, a microprocessor device, an analog-to-digital converter, a digital-to-analog converter, and the like. The processor may allocate control and signal processing functions of a mobile device between the devices based on their respective functions. In addition, the processor may include a function of operating one or more software programs, and the programs may be stored in the memory.

The functions of the processor may be implemented by hardware, or may be implemented by executing corresponding software by hardware. The hardware or software includes one or more modules corresponding to the foregoing functions.

The memory may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, and a blue-ray disc, or the like), a magnetic disk storage medium or another magnetic storage device, or any other medium that can carry or store expected program code in a form of an instruction or a data structure and can be accessed by a computer.

Optionally, the memory and the processor may be physically independent units, or the memory may be integrated with the processor.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, the disclosed system, apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

In this application, the term "at least one" refers to one or more, and the term "a plurality of" refers to two or more than two. The term "and/or" describes an association relationship for describing associated objects and represents that three relationships may exist. For example, A and/or B may represent the following three cases: Only A exists, both A and B exist, and only B exists, where A and B may be in a singular form or a plural form. The character "/" generally indicates an "or" relationship between the associated objects. "At least one (type) of the following" or a similar expression thereof refers to any combination of these types, including any combination of a single type or a plurality of types. For example, at least one (type) of a, b, or c may indicate a, b, c, a-b, a-c, b-c, or a-b-c, where a, b, c may be one or more in quantity.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by a terminal device, a physical downlink control channel (PDCCH) from a network device, wherein the PDCCH carries one or more pieces of information, the one or more pieces of information include first indication information and second indication information, a combination of the first indication information and the second indication information is two bits, and the combination of the first indication information and the second indication information indicates that the PDCCH further carries a short message or scheduling information of a paging message, and wherein a value of the two bits of 01 indicates that the scheduling information of the paging message is carried on the PDCCH, and a value of the two bits of 10 indicates that the short message is carried on the PDCCH; and
obtaining, by the terminal device based on the PDCCH, the one or more pieces of information carried on the PDCCH.

2. The method according to claim 1, wherein downlink control information (DCI) is carried on the PDCCH, and the one or more pieces of information are carried in the DCI.

3. The method according to claim 2, wherein N bits of a first field in the DCI carry the first indication information, K bits of a second field in the DCI carry the second indication information, and the first field and the second field are the same or different fields, wherein $N \geq 1$ and N is an integer, and $K \geq 1$ and K is an integer.

4. The method according to claim 1, wherein when the PDCCH is received the terminal device is in a connected mode or in an idle mode.

5. A method, comprising:
sending, by a network device, a physical downlink control channel (PDCCH) to a terminal device, wherein the PDCCH carries one or more pieces of information, the one or more pieces of information include first indication information and second indication information, a combination of the first indication information and the second indication information is two bits, and the combination of the first indication information and the second indication information indicates that the PDCCH further carries a short message or scheduling information of a paging message, and wherein a value of the two bits of 01 indicates that the scheduling information of the paging message is carried on the PDCCH, and a value of the two bits of 10 indicates that the short message is carried on the PDCCH.

6. The method according to claim 5, wherein downlink control information (DCI) is carried on the PDCCH, and the one or more pieces of information are carried in the DCI.

7. The method according to claim 6, wherein N bits of a first field in the DCI carry the first indication information, K bits of a second field in the DCI carry the second indication information, and the first field and the second field are the same or different fields, wherein $N \geq 1$ and N is an integer, and $K \geq 1$ and K is an integer.

8. An apparatus, comprising:
a receiver, configured to receive a physical downlink control channel (PDCCH) from a network device, wherein the PDCCH carries one or more pieces of information, the one or more pieces of information include first indication information and second indication information, a combination of the first indication information and the second indication information is two bits, and the combination of the first indication information and the second indication information indicates that the PDCCH further carries a short message or scheduling information of a paging message, and wherein a value of the two bits of 01 indicates that the scheduling information of the paging message is carried on the PDCCH, and a value of the two bits of 10 indicates that the short message is carried on the PDCCH; and
a processor, configured to obtain, based on the PDCCH, the one or more pieces of information carried on the PDCCH.

9. The apparatus according to claim 8, wherein downlink control information (DCI) is carried on the PDCCH, and the one or more pieces of information are carried in the DCI.

10. The apparatus according to claim 9, wherein N bits of a first field in the DCI carry the first indication information, K bits of a second field in the DCI carry the second indication information, and the first field and the second field are the same or different fields, wherein $N \geq 1$ and N is an integer, and $K \geq 1$ and K is an integer.

11. The apparatus according to claim 8, wherein the apparatus is a terminal device, and when the PDCCH is received the terminal device is in a connected mode or in an idle mode.

12. An apparatus, comprising:
a transmitter, configured to send a physical downlink control channel (PDCCH) to a terminal device, wherein the PDCCH carries one or more pieces of information, the one or more pieces of information include first indication information and second indication information, a combination of the first indication information and the second indication information is two bits, and the combination of the first indication information and the second indication information indicates that the PDCCH further carries a short message or scheduling information of a paging message, and wherein a value of the two bits of 01 indicates that the scheduling information of the paging message is carried on the PDCCH, and a value of the two bits of 10 indicates that the short message is carried on the PDCCH.

13. The apparatus according to claim 12, wherein downlink control information (DCI) is carried on the PDCCH, and the one or more pieces of information are carried in the DCI.

14. The apparatus according to claim 13, wherein N bits of a first field in the DCI carry the first indication information, K bits of a second field in the DCI carry the second indication information, and the first field and the second field are the same or different fields, wherein $N \geq 1$ and N is an integer, and $K \geq 1$ and K is an integer.

* * * * *